(12) United States Patent
Rath et al.

(10) Patent No.: US 7,485,764 B2
(45) Date of Patent: Feb. 3, 2009

(54) METHOD FOR THE PRODUCTION OF POLYISOBUTENE

(75) Inventors: Hans Peter Rath, Gruenstadt (DE); Stephan Hueffer, Ludwigshafen (DE); Gabriele Lang, Mannheim (DE); Arno Lange, Bad Duerkheim (DE); Eckard Schauss, Heuchelheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 515 days.

(21) Appl. No.: 10/526,936

(22) PCT Filed: Sep. 18, 2003

(86) PCT No.: PCT/EP03/10429

§ 371 (c)(1),
(2), (4) Date: Mar. 8, 2005

(87) PCT Pub. No.: WO2004/029099

PCT Pub. Date: Apr. 8, 2004

(65) Prior Publication Data

US 2006/0122447 A1    Jun. 8, 2006

(30) Foreign Application Priority Data

Sep. 19, 2002 (DE) ............................... 102 43 476

(51) Int. Cl.
*C07C 2/02* (2006.01)
*C08F 2/00* (2006.01)
*C08F 4/14* (2006.01)
*C08F 110/10* (2006.01)

(52) U.S. Cl. .................. 585/525; 585/520; 526/209; 526/210; 526/212; 526/237; 526/348.7

(58) Field of Classification Search ........... 585/520, 585/525; 526/209, 210, 212, 537, 348.7
See application file for complete search history.

(56) References Cited

U.S. PATENT DOCUMENTS

| 5,286,823 A | 2/1994 | Rath |
| 2003/0088135 A1* | 5/2003 | Yun et al. ............... 585/525 |

FOREIGN PATENT DOCUMENTS

| DE | 27 02 604 | 7/1978 |
| DE | 198 25 334 | 12/1999 |
| EP | 0 807 641 | 11/1997 |
| EP | 1 026 175 | 8/2000 |
| WO | 93 10063 | 5/1993 |
| WO | 02 38630 | 5/2002 |

\* cited by examiner

*Primary Examiner*—Glenn Caldarola
*Assistant Examiner*—In Suk Bullock
(74) *Attorney, Agent, or Firm*—Oblon, Spivak, McClelland, Maier & Neustadt, P.C.

(57) ABSTRACT

A process for the preparation of polyisobutene containing at least 75 mol % of terminal vinylidene groups, in which isobutene or an isobutene-containing hydrocarbon mixture is polymerized in the liquid phase in the presence of a boron trifluoride complex catalyst having the composition $a(BF_3):b(Co1):c(Co2)$ where Co1 is at least one tertiary alcohol, Co2 is at least one compound selected from water, primary alcohols, secondary alcohols, dialkyl ethers, alkanecarboxylic acids and phenols, the ratio c:b is from 0.9 to 1.8 and the ratio (b+c):a is from 0.9 to 3.0, is described.

14 Claims, No Drawings

METHOD FOR THE PRODUCTION OF POLYISOBUTENE

CROSS REFERENCES TO RELATED APPLICATIONS

This application is a national stage application of International Patent Application No. PCT/EP03/10429, filed on Sep. 18, 2003, and claims priority to German Patent Application No. 102 43 576.6, filed on Sep. 19, 2002, both of which are incorporated herein by reference in their entireties.

The present invention relates to a process for the preparation of polyisobutene containing at least 75 mol % of terminal vinylidene groups.

In the context of the present application, terminal vinylidene groups or terminal double bonds are understood as meaning those double bonds whose position in the polyisobutene macromolecule is described by the formula

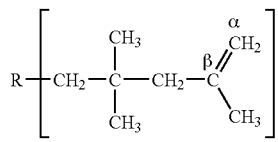

where R is a polyisobutenyl radical. The type and proportion of the double bonds present in the polyisobutene can be determined with the aid of $^1$H or $^{13}$C—NMR spectroscopy.

Such highly reactive polyisobutenes are used as an intermediate for the preparation of additives for lubricants and fuels, as described, for example, in DE-A 27 02 604. The highest reactivity is exhibited by the terminal vinylidene groups with 2-methyl substitution, whereas neopentyl substitution or the double bonds located further toward the inside of the macromolecules have no reactivity or only low reactivity in the conventional functionalization reactions, depending on their position in the macromolecule. The proportion of terminal vinylidene groups in the molecule is therefore the most important quality criterion for this type of polyisobutene.

The broadness of the molecular weight distribution being characterized by the ratio of the weight average molecular weight $M_w$ and the number average molecular weight $M_n$ is a further important quality criterion for polyisobutenes. Narrow molecular weight distributions, i.e. small values of the ratio $M_w/M_n$, are preferred.

U.S. Pat. No. 5,286,823 describes a process for the preparation of highly reactive polyisobutenes by cationic polymerization of isobutene in the presence of boron trifluoride and secondary alcohols of 3 to 20 carbon atoms and/or ethers of 2 to 20 carbon atoms.

WO 93/10063 discloses boron trifluoride etherate complexes in which the ether has at least one tertiary carbon atom bonded to the ether oxygen atom. The complexes are used for the polymerization of olefins, in particular isobutene, to give polymers having a high content of vinylidene groups.

EP-A 1 026 175 describes the preparation of isobutene polymers comprising at least 80 mol % of molecules having a terminal vinylidene structure with the use of complex catalysts comprising boron trifluoride, ether and alcohol and/or water in specific amounts.

The achievable molecular weight of the polyisobutene depends—apart from other factors—decisively on the relative amount, based on the olefin monomers used, of the boron trifluoride complex catalysts. Lower molecular weights are achieved with larger amounts of catalyst, and vice versa. The required amount of boron trifluoride constitutes a considerable cost factor in the preparation of low molecular weight polyisobutenes.

It is an object of the present invention to provide a process for the preparation of polyisobutenes having a high content of terminal vinylidene double bonds, in which lower molecular weights are obtained with a given relative amount of complex catalyst or the amount of catalyst can be reduced to obtain a given molecular weight. Furthermore, the obtained polyisobutenes should have a narrow molecular weight distribution.

We have found that this object is achieved, according to the invention, by a process for the preparation of polyisobutene containing at least 75 mol % of terminal vinylidene double bonds, in which isobutene or an isobutene-containing hydrocarbon mixture is polymerized in the liquid phase in the presence of boron trifluoride complex catalysts having the composition

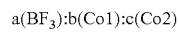

where

Co1 is at least one tertiary alcohol,
Co2 is at least one compound selected from water, primary alcohols, secondary alcohols, dialkyl ethers, alkanecarboxylic acids and phenols,
the ratio c:b is from 0.9 to 1.8, preferably from 0.8 to 1.2, and
the ratio (b+c):a is from 0.9 to 3.0, preferably from 1.0 to 2.5.

Suitable starting materials (isobutene feedstock) for the novel process are both pure isobutene and isobutene-containing hydrocarbon mixtures, for example butadiene-free refined $C_4$-fractions from crackers or $C_4$-cuts from isobutane dehydrogenation having isobutene contents of more than 40% by weight. Inert solvents, such as saturated hydrocarbons, such as pentane, hexane or isooctane, or halogenated hydrocarbons, such as dichloromethane or trichloromethane, may be present.

The catalysts used in the novel process are boron trifluoride complexes with at least two complexing agents, i.e. at least one tertiary alcohol and at least one compound which is selected from water, primary alcohols, secondary alcohols, dialkyl ethers, alkanecarboxylic acids and phenols. The complexing agents influence the polymerization activity of the boron trifluoride in such a way that, on the one hand, the polymerization gives a low molecular weight polyisobutene and, on the other hand, the isomerization activity of boron trifluoride with respect to the isomerization of terminal double bonds to unreactive or only slightly reactive double bonds located in the interior of the polyisobutene molecule is reduced.

Suitable complexing agents Co1 are, for example, tert-butanol and 1,1-dimethyl-1-propanol, of which tert-butanol is most preferred. Suitable complexing agents Co2 are water, primary alcohols, preferably $C_1$- to $C_{20}$-alcohols, secondary alcohols, preferably $C_3$- to $C_{20}$-alcohols, phenols, such as phenol, which may carry one or more alkyl substituents, carboxylic acids, preferably $C_1$- to $C_{20}$-carboxylic acids, and dialkyl ethers, preferably $C_2$- to $C_{20}$-dialkyl ethers, preferably preferred among which are those in which at least one alkyl radical is a secondary or tertiary alkyl radical. Water, primärey alcohols, preferably those having from 1 to 10 and especially from 1 to 4 carbon atoms, and secondary alcohols, preferably those having from 3 to 10 and especially 3 or 4 carbon atoms, mixtures of water and primary or secondary alcohols and mixtures of primary and secondary alcohols are preferred cocatalysts Co2. Primary and secondary alcohols having a maximum of 4 carbon atoms are more preferred. Methanol, ethanol, 2-propanol and 2-butanol are most preferred as complexing agents Co2.

Before they are used, the boron trifluoride complex catalysts can be premolded or preferably can be produced in situ in the polymerization reactor, as described in EP-A 628 575. Gaseous boron trifluoride is expediently used as a raw material for the preparation of the boron trifluoride complex catalysts, it being possible to use technical-grade boron trifluoride still containing small amounts of sulfur dioxide and $SiF_4$ (purity: 96.5% by weight), but preferably high-purity boron trifluoride (purity: 99.5% by weight). Silicon tetrafluoride-free boron trifluoride is particularly preferably used for the preparation of the catalyst.

Preferably from 0.5 to 10 mmol of complex catalyst, calculated as boron trifluoride, are used per mol of olefin monomers.

The polymerization of the isobutene is preferably carried out by a continuous process. Conventional reactors, such as tubular reactors, tube-bundle reactors or stirred kettles, can be employed for this purpose. The polymerization is preferably effected in a loop reactor, i.e. a tubular or tube-bundle reactor with continuous circulation of the reaction medium, it being possible as a rule to vary the ratio of feed to circulation F/C in the range from 1:5 to 1:500, preferably from 1:10 to 1:200, v/v.

The polymerization is expediently carried out at below 0° C., preferably at from 0 to −40° C., in particular from −10 to −40° C., particularly preferably from −20 to −40° C. As a rule, the polymerization is carried out at from 0.5 to 20 bar (absolute). The choice of the pressure range depends primarily on the process engineering conditions. Thus, it is advisable to employ evaporative cooling and hence autogenous pressure, i.e. reduced pressure, in the case of stirred kettles, whereas circulation reactors (loop reactors) operate better at superatmospheric pressure. At the same time, the mixing in of the boron trifluoride is accelerated by pressure and turbulence, so that this reactor type is preferred. However, the choice of pressure is generally unimportant with regard to the result of the polymerization reaction.

The polymerization is preferably carried out under isothermal conditions. Since the polymerization reaction is exothermic, the heat of polymerization must be removed in this case. This is done, as a rule, with the aid of a cooling apparatus which can be operated, for example, with liquid ammonia as a coolant. Another possibility is to remove the heat of polymerization by evaporative cooling on the product side of the reactor. This is done by evaporating the isobutene and/or other, more readily volatile components of the isobutene feedstock. The type of cooling depends on the reactor type used in each case. Tubular reactors are preferably cooled by means of external cooling, the reaction tubes being cooled, for example, by means of a cooling jacket with boiling ammonia. Stirred kettle reactors are preferably thermostated by internal cooling, for example by means of cooling coils, or by evaporative cooling on the product side.

The residence time of the isobutene to be polymerized in the reactor is from 1 to 120, preferably from 5 to 60, minutes, depending on reaction conditions and desired properties of the polymer to be prepared.

For the working-up, the reaction discharge is expediently passed into a medium which deactivates the polymerization catalyst and stops the polymerization in this way. For example, water, alcohols, ether, acetonitrile, ammonia, amines or aqueous solutions of mineral bases, such as alkali metal and alkaline earth metal hydroxide solutions, solutions of carbonates of these metals, and the like can be used for this purpose. Stopping with water at from 20 to 40° C., for example in the form of scrubbing under pressure, is preferred. The temperature of the water used depends on the desired mixing temperature at which the phase separation takes place. In the further course of the working-up, the polymerization mixture is, if required, subjected to one or more extractions for removing residual amounts of catalyst—usually methanol—or to scrubbing with water. In the case of scrubbing with water, hydrogen fluoride formed in the course of the polymerization is also removed in addition to the catalyst. Unconverted isobutene, solvents and volatile isobutene oligomers are then separated off by distillation. The bottom product is freed from residues of solvent and monomers, for example by means of an annular gap evaporator or by devolatilization in an extruder.

It is also possible to separate the boron trifluoride complex from the reactor effluent, e.g. by addition of primary or secondary alcohols having from 1 to 4 or 3 to 4 carbon atoms and/or water and/or by cooling, in order to reduce the solubility of the boron trifluoride complex in the reactor effluent. From the reactor effluent at least a part of the complex can be separated and reintroduced into the reactor after enrichment with boron trifluoride. By this, additional amounts of boron trifluoride can be saved.

If pure isobutene is used as starting material, it, like the isobutene oligomers and solvent, can be recycled to the polymerization. With the use of isobutene-containing $C_4$-cuts, the unconverted isobutene and the other $C_4$-hydrocarbons are in general not recycled but are put to other uses, for example for the preparation of low molecular weight polyisobutene or of methyl tert-butyl ether. Readily volatile fluorine-containing byproducts, such as sec- and tert-butyl fluoride, can be removed from the polyisobutene together with the other hydrocarbons and can be separated from these hydrocarbons by distillation or extraction.

The novel process makes it possible to prepare highly reactive polyisobutene both from pure isobutene and from isobutene-containing hydrocarbon mixtures. By means of the novel process, it is possible to achieve number average molecular weights of from 500 to 50 000, preferably from 500 to 2 500, Dalton in combination with a content of terminal double bonds of at least 75, preferably at least 78, particularly preferably at least 80, mol %. Moreover, the polyisobutenes obtained are characterized by a narrow molecular weight distribution. They preferably have a dispersity $M_w/M_n$ of from 1.3 to 5, in particular from 1.2 to 2.

The examples which follow illustrate the invention.

EXAMPLES

Miniplant:

The reactor used was a circulation reactor consisting of a stainless steel tube having an internal diameter of 4 mm and a length of 7.1 m and a gear pump having a delivery of 50 l/h; the total reaction volume was 100 ml. Tube and pump heads were immersed in a cryostat at a bath temperature of −15° C. The feeds were located on the suction side of the gear pump and the reactor exit on the pressure side via a capillary having an internal diameter of 2 mm and a length of 40 cm and a means for keeping the pressure at 3 bar. Immediately behind the pressure control means was a mixing pump by means of which water was introduced for stopping the reaction. In a settling vessel having a level maintaining means, the aqueous phase was separated off at 20° C. and the organic phase was dried over alumina in an adsorption column (residence time 5 minutes) before being devolatilized in two stages. The first devolatilization stage operated at atmospheric pressure and a bottom temperature of 150° C., while the second stage operated at 10 mbar and a bottom temperature of 210° C. The vapors were condensed and, two hours after the beginning of the experiment, were recycled into the polymerization system, and consumed isobutene was replenished.

Experimental Procedure:

Initially, the apparatus was filled with pure hexane. 307 g/h of isobutene and 317 g/h of hexane and all further feeds were then introduced, the complexing agent being metered in the form of a 10% strength solution in hexane. With the use of water as a co-complexing agent, the water was fed with the isobutene to the reactor. It was ensured that the feed point was not immersed in the cooling liquid of the cryostat so that the water could not freeze out. The amount of $BF_3$ was metered at a constant rate and the amount of complexing agent was regulated so that the conversion was 90%. The polymerization temperature was brought to −10° C. by means of the bath temperature of the cryostat.

The table below shows the results of the polymerization.

| | Feeds | | | | PIB after 1 hour | | PIB after 3 days | |
|---|---|---|---|---|---|---|---|---|
| | $BF_3$ | tert-Butanol | Co-complexing agent | | Molecular weight | Reactivity | Molecular weight | Reactivity |
| Ex. | [mmol/h] | [mmol/h] | Type | [mmol/h] | $M_N$ | [%] | $M_N$ | [%] |
| 1 | 10 | — | Methanol | 15 | 1150 | 78 | — | — |
| 2 | 10 | — | Ethanol | 17 | 1070 | 82 | — | — |
| 3 | 10 | — | Isoprop. | 18 | 1030 | 85 | — | — |
| 4 | 10 | 12 | — | — | No stable course | | | |
| 5 | 10 | 9 | Methanol | 9 | 790 | 82 | 750 | 85 |
| 5 | 10 | 8 | Methanol | 5 | 800 | 82 | 770 | 85 |
| | | | Water | 5 | | | | |
| 6 | 10 | 9 | Isoprop. | 9 | 780 | 85 | 730 | 83 |
| 7 | 10 | 10 | DIPE | 10 | 800 | 83 | 780 | 83 |
| 8 | 10 | 11 | MTBE | 11 | 820 | 84 | 790 | 85 |

DIPE = Diisopropyl ether
MTBE = Methyl tert-butyl ether

We claim:

1. A process for the preparation of polyisobutene comprising at least 75 mol% of terminal vinylidene groups, wherein isobutene or an isobutene-containing hydrocarbon mixture is polymerized in a liquid phase in the presence of a boron trifluoride complex catalyst having a composition

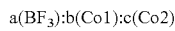

$a(BF_3):b(Co1):c(Co2)$ wherein
   Co1 is at least one tertiary alcohol,
   Co2 is at least one compound selected from the group consisting of water, primary alcohols, secondary alcohols, alkanecarboxylic acids and phenols,
   the ratio c:b is from 0.9 to 1.8 and
   the ratio (b+c):a is from 0.9 to 3.0.

2. A process as claimed in claim 1, wherein said Co1 is tert-butanol.

3. A process as claimed in claim 1, wherein said Co2 is methanol, ethanol, 2-propanol or 2-butanol.

4. A process as claimed in claim 1, wherein said polyisobutene has a number average molecular weight $M_n$ of from 500 to 50 000 Dalton.

5. A process as claimed in claim 1, wherein said Co1 is 1,1-dimethyl-1-propanol.

6. A process as claimed in claim 1, wherein 0.5 to 10 mmol of said catalyst, calculated as boron trifluoride, are used per mol of olefin monomers.

7. A process as claimed in claim 1, wherein polymerization of the isobutene is carried out by a continuous process.

8. A process as claimed in claim 1, wherein a reactor is used which is selected from the group consisting of a tubular reactor, a tube-bundle reactor and a stirred kettle.

9. A process as claimed in claim 1, wherein the polymerization is effected in a loop reactor,
   wherein said loop reactor is a tubular or tube-bundle reactor with continuous circulation of the reaction medium, wherein a ratio of feed to circulation F/C is in the range of from 1:5 to 1:500 v/v.

10. A process as claimed in claim 1, wherein the polymerization is carried out at below 0° C.

11. A process as claimed in claim 1, wherein the polymerization is carried out at from 0.5 to 20 bar (absolute).

12. A process as claimed in claim 1, wherein the polymerization is carried out under isothermal conditions.

13. A process as claimed in claim 1, wherein a residence time of the isobutene to be polymerized in the reactor is from 1 to 120 minutes.

14. A process as claimed in claim 1, wherein the polyisobutenes obtained have a dispersity Mw/Mn of from 1.3 to 5.

* * * * *

UNITED STATES PATENT AND TRADEMARK OFFICE
CERTIFICATE OF CORRECTION

| | | |
|---|---|---|
| PATENT NO. | : 7,485,764 B2 | Page 1 of 1 |
| APPLICATION NO. | : 10/526936 | |
| DATED | : February 3, 2009 | |
| INVENTOR(S) | : Rath et al. | |

It is certified that error appears in the above-identified patent and that said Letters Patent is hereby corrected as shown below:

On the title page, Item (30), the Foreign Application Priority Data is incorrect. Item (30) should read:

Item -- (30)  Foreign Application Priority Data

Sep. 19, 2002  (DE)  .................................... 102 43 576 --

Signed and Sealed this

Sixteenth Day of March, 2010

David J. Kappos
*Director of the United States Patent and Trademark Office*